United States Patent [19]

Nava et al.

[11] 4,300,242

[45] Nov. 17, 1981

[54] MOLDED REINFORCED ARTICLE AND METHOD

[75] Inventors: Pier L. Nava, via Carnovali 100/C, Bergamo, Italy; Carlo Testa, Somma Lombardo; Davide Frigerio, Gallarate, both of Italy

[73] Assignee: Pier Luigi Nava, Bergamo, Italy

[21] Appl. No.: 122,546

[22] Filed: Feb. 19, 1980

[30] Foreign Application Priority Data

Mar. 30, 1979 [IT] Italy ............................... 21465 A/79

[51] Int. Cl.³ ................................................. A42B 3/02
[52] U.S. Cl. ............................................. 2/412; 2/425
[58] Field of Search ............................ 2/410, 412, 425

[56] References Cited

U.S. PATENT DOCUMENTS

| | | | |
|---|---|---|---|
| 2,115,065 | 4/1938 | Dym | 2/412 |
| 2,123,275 | 7/1938 | Dym | 2/412 |
| 2,312,227 | 2/1943 | Yant | 2/412 |
| 2,532,442 | 12/1950 | Daly | 2/412 |
| 2,610,322 | 9/1952 | Daly | 2/412 |
| 2,746,049 | 5/1956 | Hudson | 2/412 |
| 2,766,453 | 10/1956 | Frieder et al. | 2/412 |
| 3,353,187 | 11/1967 | Lastnik et al. | 2/412 |

Primary Examiner—Louis Rimrodt
Attorney, Agent, or Firm—Ladas & Parry

[57] ABSTRACT

A process for manufacturing caps, such as helmets, of reinforced resin, the reinforcement of which is comprised of a tricot or net-like material. The process comprises shaping the textile reinforcement, made of a plurality of layers of two or more textile caps to conform to the male component of a mold having complementary male and female components, inserting the male part, with the textile reinforcement, into the complementary female part of the mold, imparting a controlled tension to said textile reinforcement and injecting resin, in a liquid state, into the mold to envelope said textile reinforcement, and allowing said resin to solidify to thus obtain the cap, the reinforcement of which is enveloped in the resin in a state of tension. An impact resistant resin structure in the form of a cap is provided by said process.

7 Claims, 3 Drawing Figures

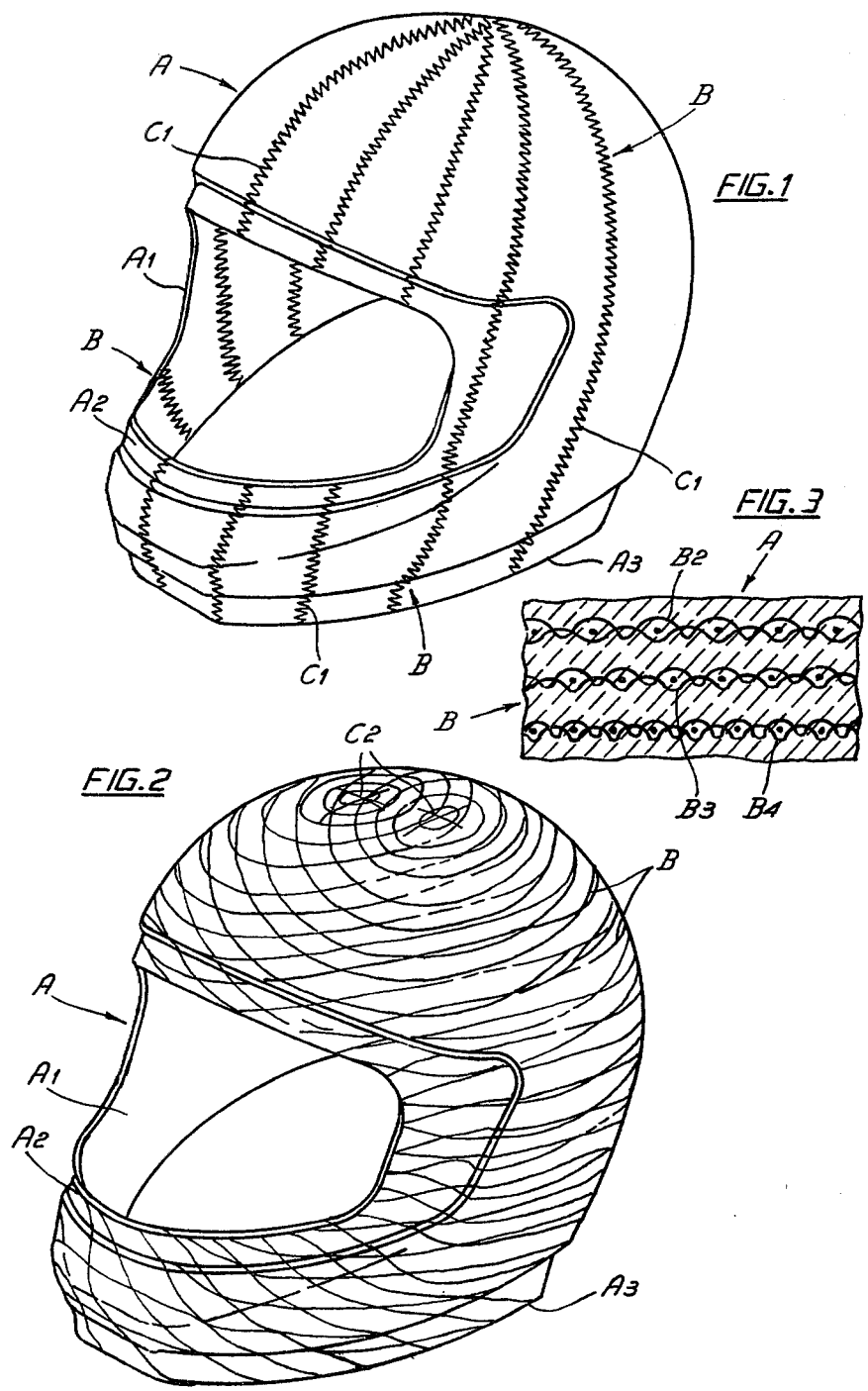

MOLDED REINFORCED ARTICLE AND METHOD

SUMMARY

Reinforced shock resistant resin structure and related procedure of manufacture:

The resin structure according to this invention is used to produce tanks, helmets or the like; to provide protective helmets (see FIG. 2). The falsework consists of elementary pockets B with tricot material to obtain a polygonal reticulate fabric.

The tricot knit pockets B are manufactured commencing from a central focal point and proceding spiralwise progressively increasing the number of stitches up to a pre-determined value. The knitting process is continued until the desired length of the pocket is reached.

While a pre-determined tension is given to pockets B, these are overlapped and introduced on the male part of a die, the whole is then introduced in the complementary cavity of the die where liquid resin is poured.

The resin incorporating the textile structure is then pressed so as to obtain the desired shape.

DESCRIPTION

The present invention deals with a reinforced shock resistant resin structure and its relative method of manufacture.

The structure herein after will be referred to simply as a reinforced, shock resistant suitable resin structure made with layers of reinforced textile materials.

Said structures of this type find wide use in many fields, e.g. to provide tanks with safe anti-shock protective lining, fairing of vehicles and, in particular, protective helmets to be used in sports, at work or other similar uses. Such structures must be able to resist and act as shock absorbers in cases of impact, particularly when hit.

With referral to the manufacture of protective helmets, where the invention has a specific but not exclusive application, said helmets must be able to perform satisfactorily during impact especially upon penetrating foreign objects thus securing as far as possible, the safety of the wearer. Obviously, such helmets must be able to successfully stand repeated shocks which are of equal force and which do not surpass specified given limit. Because of their specific use, the helmets, besides having the strengthened structure, must be light and easy to use therefore they are made of an amalgam of resin and reinforced textile material. Heat resistant poli-carbon thermoplastics interlaced with reinforced textile materials are put to good advantage. Said reinforced textile materials are made from natural, artificial or synthetic fibres, including glass fibres which are intertwined in the same characteristic "warp and weft" way textiles are made.

The shock-resistant structures armoured with this type of protective material: warp and weft, present some discrepancy in so far as they do not secure the necessary protection and entireness (wholeness) of the material itself against repeated impact because said structures are easily subject to wear, easily losing their protective function especially when and if hit repeatedly in the same spot. In short the known shock resistant structures, are subject to the so called phenomena of delamination, that is to say the flaking off or delamination occurs in so far as the characteristics of durability and elasticity vary in the same structure according to directions different from those of warp and weft which constitute the falsework itself: in other words, the durability and elasticity rapidly decrease in proportion to the increase of the angle of misalignment between the direction of the filaments and the area of impact or, in an equivalent way, between said filaments and the direction of impact.

This drawback is even more evident in the case of protective helmets due to their predominantly rounded shape, also because the forces of impact exerted upon the surface of the helmet do not meet with an effective rational elastic collision from the armoured structure: This is due to the substantial difference of direction of the warp and weft filament in comparison with the force of impace. Furthermore, the protective structure of the helmet, under impact, cracks continuously with a flaking action which, progressively neutralizes its elasticity thus destroying the said structure right into the layers of armoured textile.

The invention aims at neutralizing this and other discrepancies and to furnish durable resin structures using reinforced textile materials which, under repeated impact, within a limit of pre-determined intensity, will react with elasticity without cracking particularly without flaking between layers of the protective structure.

Another aim of the invention is to manufacture a specified type of armoured textile structure which will oppose constant resistance to dynamic impact from all directions; that is to say the strength of the blow is distributed along the surface of impact according to the length of radii decreasing in length as they move further away from impact zone so as to obtain a concentric distribution of shock produced by stress.

Further aim of the invention is to provide a shock-resistant falsework particularly for helmets, which is easy to make, light and built according to the known safety frames, having the same thickness with elasticity and favourable reaction to all manner of impacts even when considerably intense.

The shock-resistant structure of the present invention made with resin which incorporates a reinforced textile frame is characterised in so far as that at least part of the reinforcement is made with a jersey material (TRICOT) in a net pattern or similar so that the threads of the textile reinforcement are in a sense contrary to the weaving pattern of the textile armour itself.

The concept, in practice, may be used in many ways depending on the need and usage, for instance, the tricot (net) is given a suitable tension so as to anchor it securely to the resin layer in the desired pre-tension. Furthermore the pre-tension load between the different textile reinforcing elements of the falsework may be varied to provide a frame in which the overlapping textile layers are differently pre-stressed in succession to achieve the desired result.

Moreover, the resistant textile material making up the falsework may have different characteristics both from the physical viewpoint (e.g. dimensions and layout of tricot and of filaments) and from the chemical viewpoint (the use of neutral fibres and/or filaments, artificial fibres, synthetic materials such as fibreglass etc.)

In one of the embodiments according to the invention to provide caps and consequently protective helmets, the tricot and/or net falsework consists of a plurality of tubular overlapping elements closed at the end to form pockets. Said pockets are arranged to overlap so as to form joints which are for example sewn together to provide falsework apt to withstand a considerable amount of stress. In a further embodiment of this invention, the textile falsework consists of one or more superimposed elements each of which in turn consists of a woven cap or net arranged in a spiral form. Said overlapping caps are arranged to provide central zones which are off-set with respect to each other so as to form a polygonal contour.

The invention will now be explained with referral to the drawings provided by way of example in which:

FIGS. 1 and 2 are front views of the helmets constructed in accordance with the procedure of this invention.

FIG. 3 is a detailed cross-section on a larger scale according to FIG. 1.

The procedure described in this invention, can be clearly understood by referring to the structural characteristics as shown on the afore-said drawings.

The helmet as shown in FIG. 1, consists of a cap A fabricated in a suitable type of resin e.g. thermoplastic or heat-resistant hardened resin obtained with dies appropriately shaped to obtain the required profiles. In our specific case the front part of helmet A is provided with an opening A1 the edge of which A2, forms a rim apt to house a transparent visor not shown in the above-mentioned drawings. Said A1 opening is obtained after the die-casting operation of cap A by punching or similar procedure.

We will now explain by way of example the different manufacturing steps for cap A by utilizing a die consisting of two separate parts, i.e. the first or male part of the die and ganges (with a certain amount of tolerance) the cavity in the second or female element. The male part of the die (which reproduces the internal outline of cap A) is fitted with a plurality of elementary pockets B1, B2, etc. (see FIG. 3) so as to form the textile falsework of suitable thickness for said cap A.

According to this invention, at least a part of elements B consists of a tricot/net mesh material to form a reticulate structure consisting of a plurality of quadrilateral, pentagonal, hexagonal polygons. In the specific case of FIG. 1, the tubular element is closed at one of its ends e.g. by stitches (see FIG. 1) or by welding in case the tricot/net is woven with synthetic fibre.

Depending on specific requirements, the elementary pockets B can be impregnated with resin to obtain a suitable clearance between layers of textile material. The introduction and overlapping of the different pockets in the male die, is effected by imparting a pre-tension to at least a part of the elementary pockets so as to deform the reticular structure of the textile tricot of the pockets in question. The tension applied to the single elementary pockets may vary gradually from the first to the last pocket in the structure of the falsework. The rounded shape of the male die under reference, the tension imparted to the single elementary pockets may be applied evenly over the entire opening or circumference of the pocket; said tension may also be applied prevalently in a given section or area of said opening to form one or more differentiated tension zones which are then orientated along the meridian of cap A. For example, the differentiated tension zone may be located in a position corresponding to the seam C1. Since the C1 stitches at the bottom of the textile pockets B can be substantially extended over the entire top part of cap A, said stitches C1 on the pockets are off-set at an angle in reference to the meridians as shown in FIG. 1. It is so possible to provide a resistant structure whose reinforced zones run in parallel to the meridians of the cap A.

The openings of elementary pockets B when subjected to tension, are firmly anchored to the base of the male die in order to keep the pockets taut until the end of die-casting phase.

The male die with the elementary pockets B arranged in the required order, is inserted into the female die and introduced in the cavity; a suitably fluidized resin is then poured into the die so as to amalgamate the falsework. This phase is carried out in the usual manner, for example by pouring, immersion, injection, etc. to obtain full penetration of the substance into the mould cavity, and thus reproduce the shape of cap A. Once the resin has solidified, said cap A can conveniently be removed from the mould and subjected to the usual finishing procedures such as deburring, smoothing, etc. In the specific case of helmets said caps A are completed with mechanical action to provide openings A1, holes, etc., and any other specification required for its use. In FIG. 3 one can see in detail an enlarged cross section of Cap A. FIG. 3 also shows the different layers of tricot B2, B3 and B4 to which different tensions have been imparted to modify the reticulate structure incorporated in and anchored in the resin substance of cap A.

FIG. 2 of the drawings shows a different form of embodiment of cap A where the textile falsework B consists of a plurality of layers of textile materials overlapping each other each consisting of a tricot weave with a spiral placement. In this case the overlapping caps are placed in the male section of the mould so that the C2 centre part of the overlapping caps are off-set in respect to the central zone of the elementary adjacent caps in such a way that said centres C2 are placed in relation to the tip of a polygon. Also in this case, to at least part of the elementary caps a pre-estimated tension may be set, said tension may be varied in relation to the adjacent complementary caps. In order to secure a complete rational anchorage of the textile components which constitute armour B. The edges of the openings of said elements may be at least in part reinforced or thickened close to where the edge of the rim meets the insertion opening A3 of cap A.

In the specific case of providing protective helmets and other shaped structures, the textile armour may be composed of elements woven in a net or tricot style, shaped in such a way as to reproduce a wanted form, for instance, said tricot may be made or shaped to look like cap A as shown in the drawing, that is to say with opening A1.

After what has been said, one can state that the aim of the invention has been fulfilled and that is to obtain shock-resistant resin structures able to withstand collision, and especially able to rationally cushion blows even in the case of repeated collision, without suffering delamination and flaking, thanks to its monolitic structure with textile armour B which allows an even distribution of substantially concentric force of impact.

Moreover, the present invention achieves a marked progress in the manufacturing of shockresistant armour because besides improving the already existing structural characteristics of the product, it also ensures the stability of the the physical characteristics of the product itself so as to enable the manufacturer to use automatic or semi-automatic equipment, thus offering competitive prices.

Though remaining within the (confines) rights of this patent, it is possible to apply variants and modifications to this product and the procedure thereof depending on the need.

We claim:

1. A process for manufacturing caps, such as helmets, of reinforced resin, the reinforcement of which is comprised of a tricot or net-like material, said process comprising:

shaping, in the form of a textile cap, the textile reinforcement;

superimposing and binding to each other a plurality of layers, comprised of two or more textile caps, adapted to form the textile reinforcement, to conform to the male component of a mold having complementary male and female components;

inserting the male part, with the textile reinforcement into the complementary female part of the mold, imparting a controlled tension to said textile reinforcement and injecting the resin, in the liquid state, into the mold to envelope said textile reinforcement which is subjected to tension;

allowing said resin to solidify to thus obtain the cap, the reinforcement of which is enveloped in the resin in a state of tension.

2. The process according to claim 1, wherein the plurality of textile caps are manufactured, at least in part, by closing one of the ends of a textile tube by means of sewing, welding, or the like and the plurality of thus obtained pouches are fixed on the male of the mold in such a way that the end seams or joints are angularly displaced with respect to one another, such as according to the meridians, and an effective tension is applied to said tubular elements.

3. The process according to claim 1, wherein at least part of the textile caps are produced of a tricot material having a spiral-like configuration, to thus obtain caps which, suitably superimposed over each other, are fixed by their edges to the male part of the mold and, subsequently, subjected to the appropriate tension.

4. The process according to claim 3, wherein the tricot material caps are superimposed on the male part of the mold in such a way that their central zones are displaced with respect to each other, substantially in accordance with the vertices of a polygon.

5. An impact resistant resin structure, in the form of a cap, such as a helmet, of reinforced resin, the reinforcement of which is comprised of a tricot or net-like material, said cap having been formed by;

shaping, in the form of a textile cap, the textile reinforcement;

superimposing and binding to each other a plurality of layers, comprised of two or more textile caps, adapted to form the textile reinforcement, to conform to the male component of a mold having complementary male and female components;

inserting the male part, with the textile reinforcement, into the complementary female part of the mold, imparting a controlled tension to said textile reinforcement and injecting the resin, in the liquid state, into the mold to envelope said textile reinforcement which is subjected to tension;

allowing said resin to solidify to thus obtain the cap, the reinforcement of which is enveloped in the resin in a state of tension.

6. The structure according to claim 5, wherein the edge of at least part of the textile caps is enlarged and reinforced to ensure the anchorage of said textile caps during tensioning thereof and to thus hold them during injection of the resin.

7. The structure according to claim 5 or 6, wherein the textile caps are comprised, at least in part, of tricot elements, the shape of which substantially corresponds to said structure.

* * * * *